United States Patent
Bassett et al.

(10) Patent No.: US 6,204,994 B1
(45) Date of Patent: Mar. 20, 2001

(54) DOOR OPENER FOR MAGNETIC TAPE DATA CARTRIDGE

(75) Inventors: Jonathan D. Bassett, Ft. Collins; Gregory A. Standiford, Loveland, both of CO (US)

(73) Assignee: Hewlett-Packard Company, Palo Alto, CA (US)

(*) Notice: Subject to any disclaimer, the term of this patent is extended or adjusted under 35 U.S.C. 154(b) by 907 days.

(21) Appl. No.: 08/767,997

(22) Filed: Dec. 13, 1996

Related U.S. Application Data

(63) Continuation of application No. 08/426,374, filed on Apr. 21, 1995, now abandoned.

(51) Int. Cl.⁷ .................................................. G11B 15/675
(52) U.S. Cl. ............................................................. 360/96.5
(58) Field of Search ..................... 360/93, 96.5; 242/338, 242/338.2, 338.4, 346, 347.1

(56) References Cited

U.S. PATENT DOCUMENTS

| | | | |
|---|---|---|---|
| 3,924,823 | 12/1975 | Cohen et al. | 242/198 |
| 4,498,112 | * 2/1985 | Georgens et al. | 360/96.5 |
| 4,556,923 | * 12/1985 | Olmsted | 360/93 |
| 4,586,095 | * 4/1986 | Olmsted | 360/93 |
| 4,608,615 | * 8/1986 | Zeavin | 360/96.5 |
| 4,673,995 | * 6/1987 | Spiegelstein | 360/93 |
| 4,677,508 | * 6/1987 | Barton, Jr. et al. | 360/96.5 |
| 4,755,900 | * 7/1988 | Zarr | 360/130.1 |
| 4,866,552 | * 9/1989 | Nagase | 360/96.5 |
| 5,025,334 | * 6/1991 | Perona et al. | 360/96.5 |
| 5,109,308 | * 4/1992 | Kukreja et al. | 360/93 |
| 5,331,485 | 7/1994 | Bryer | 360/96.5 |
| 5,440,435 | * 8/1995 | Busengdal et al. | 360/96.5 |

\* cited by examiner

Primary Examiner—William Klimowicz
(74) Attorney, Agent, or Firm—Augustus W. Winfield

(57) ABSTRACT

An apparatus for opening a door in a magnetic data tape cartridge. As a tape cartridge is inserted into a drive, a moveable plunger has a first surface that contacts an extension on the door, opening the door. As the tape cartridge is inserted further into the drive, the cartridge contacts a second surface on the plunger, moving the plunger rearward into the drive. Contacting the second surface for moving the plunger rearward reduces wear and prevents binding.

6 Claims, 8 Drawing Sheets

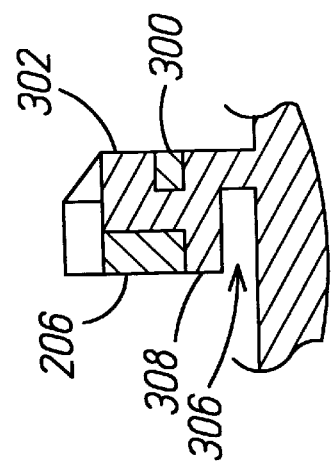
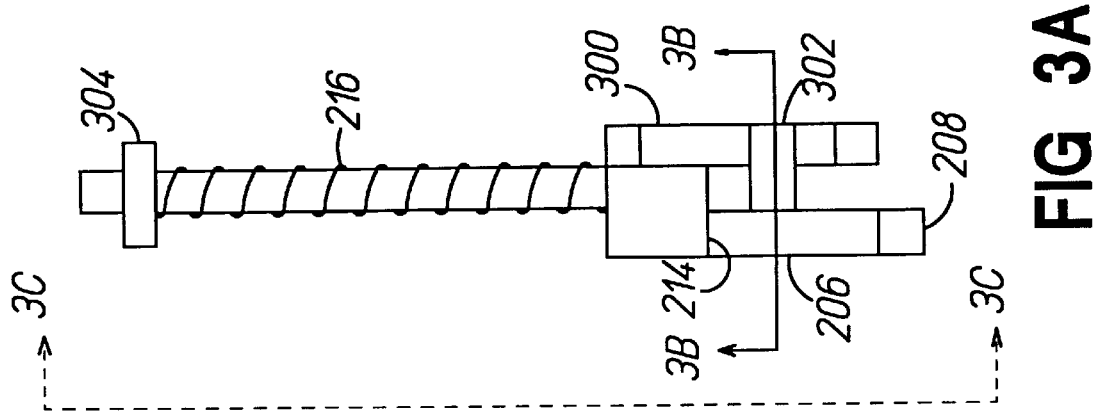

DOOR OPENER FOR MAGNETIC TAPE DATA CARTRIDGE

This is a continuation of application Ser. No. 08/426,374 filed on Apr. 21, 1995, now abandoned.

FIELD OF INVENTION

This invention relates generally to drives for magnetic tape data cartridges and more specifically to an apparatus for opening a protective door on a cartridge as the cartridge is inserted into a drive.

BACKGROUND OF THE INVENTION

Of particular interest to the present application are drives for belt-driven, rigid baseplate, magnetic tape mini-cartridges commonly used in the personal computer industry for data storage. In general, these mini-cartridges have evolved from a data cartridge design that was first introduced for use in the computer industry by the Minnesota Mining and Manufacturing Company (3M) in the early 1970's (U.S. Pat. No. 3,692,255, issued to Robert A. Von Behren in 1972). The belt driven magnetic data cartridges introduced by 3M in the early 1970's were approximately 100 mm by 150 mm and the magnetic tape was 6.35 mm (0.250 inches) wide. Cartridges of that size and corresponding drive mechanisms are still commercially available. In 1976, smaller mini-cartridges were developed, as described by Alan J. Richards, Mini Data Cartridge: A Convincing Alternative for Low-Cost, Removable Storage, Hewlett-Packard Journal, May, 1976. The mini-cartridge size is 63.5 mm by 82.5 mm. Versions of the mini-cartridge are commercially available from a variety of vendors with tape widths varying from 3.81 mm (0.150 inches) to 8.00 mm (0.315 inches).

Recently, 3M has introduced improved mini-cartridges with increased data capacity. The new mini-cartridges are larger than the mini-cartridges described above. There is a need for drives that can accommodate both the old and new tape mini-cartridges.

FIG. 1 is a top view of a mini-cartridge 100. The mini-cartridge has an alignment slot 108 along each side for guidance of the mini-cartridge during insertion into the drive. Typically, a corresponding drive has fixed guide rails that match the slots 108. In the older mini-cartridges, the cartridge slots 108 extend to point 112. The new mini-cartridges have a front surface that is identical in size to the older mini-cartridges. However, rear surfaces of the new mini-cartridges (indicated by dashed line 114) have been enlarged to permit more tape. In the new mini-cartridges, the slots 108 only extend to point 116. Therefore, the length of the drive guide rails for new mini-cartridges must be shorter than the length of the drive guide rails previously used for older mini-cartridges.

The front surface of the mini-cartridge has a door 102 (illustrated as partially open). When the door is closed, the internal magnetic tape in the mini-cartridge is protected from exposure to dust or contact with external objects. When the door 102 is open, the tape is exposed for contact with a magnetic head in the drive. The door 102 pivots around a pivot point 104 and has an extension 106 that extends beyond the pivot point. Typically, for older mini-cartridges, as the mini-cartridge is inserted into the drive, a fixed guide rail in the drive first contacts the extension 106, opening the door 102. If the length of the drive guide rail is made shorter for new mini-cartridges as discussed above, the mini-cartridge must be inserted further into the drive before the drive guide rail first makes contact with extension 106. The dimensions are such that short fixed drive guide rails cannot be used to open the door 102 because with short rails, the door cannot open completely before striking the magnetic head or other drive chassis features. Therefore, there is need for a new cartridge door opening apparatus that works with both old and new mini-cartridges.

One proposed mechanism uses a spring loaded plunger. The tip of the plunger makes contact with the extension 106 early during mini-cartridge insertion. The spring force is greater than the force required to open the door 102. When the end 116 of the slot 108 of a new mini-cartridge reaches the tip of the plunger, the end of the slot forces the plunger to retract. The plunger therefore opens the door and then retracts rearward out of the way. However, because of the curved surface at the end of the slot 108, a lateral force is placed on the plunger tending to cause the plunger to be wedged between the mini-cartridge and the chassis, resulting in excessive wear and binding of the plunger. An improved mechanism is needed that eliminates contact with the curved surface of the slot.

SUMMARY OF THE INVENTION

A spring loaded plunger has two surfaces that contact the mini-cartridge. The first surface, the plunger tip, makes contact with the extension of the mini-cartridge door. With further insertion, the plunger tip opens the mini-cartridge door and slips past the extension of the mini-cartridge door. The second surface, a step or catch, makes contact with the front surface of the mini-cartridge. Further insertion then retracts the plunger. In an alternative embodiment, the second surface contacts the opened mini-cartridge door. For either embodiment, the plunger is retracted without excessive wear or binding. The mechanism has a low part count, is easy to assemble, and is insensitive to dimensional variations in the system components.

BRIEF DESCRIPTION OF THE DRAWINGS

FIG. 3A is a plane top view of a door opener and part of a chassis in accordance with the invention.

FIG. 3B is a cross section of the door opener of FIG. 3A.

DETAILED DESCRIPTION OF THE PREFERRED EMBODIMENT OF THE INVENTION

Figure 1:
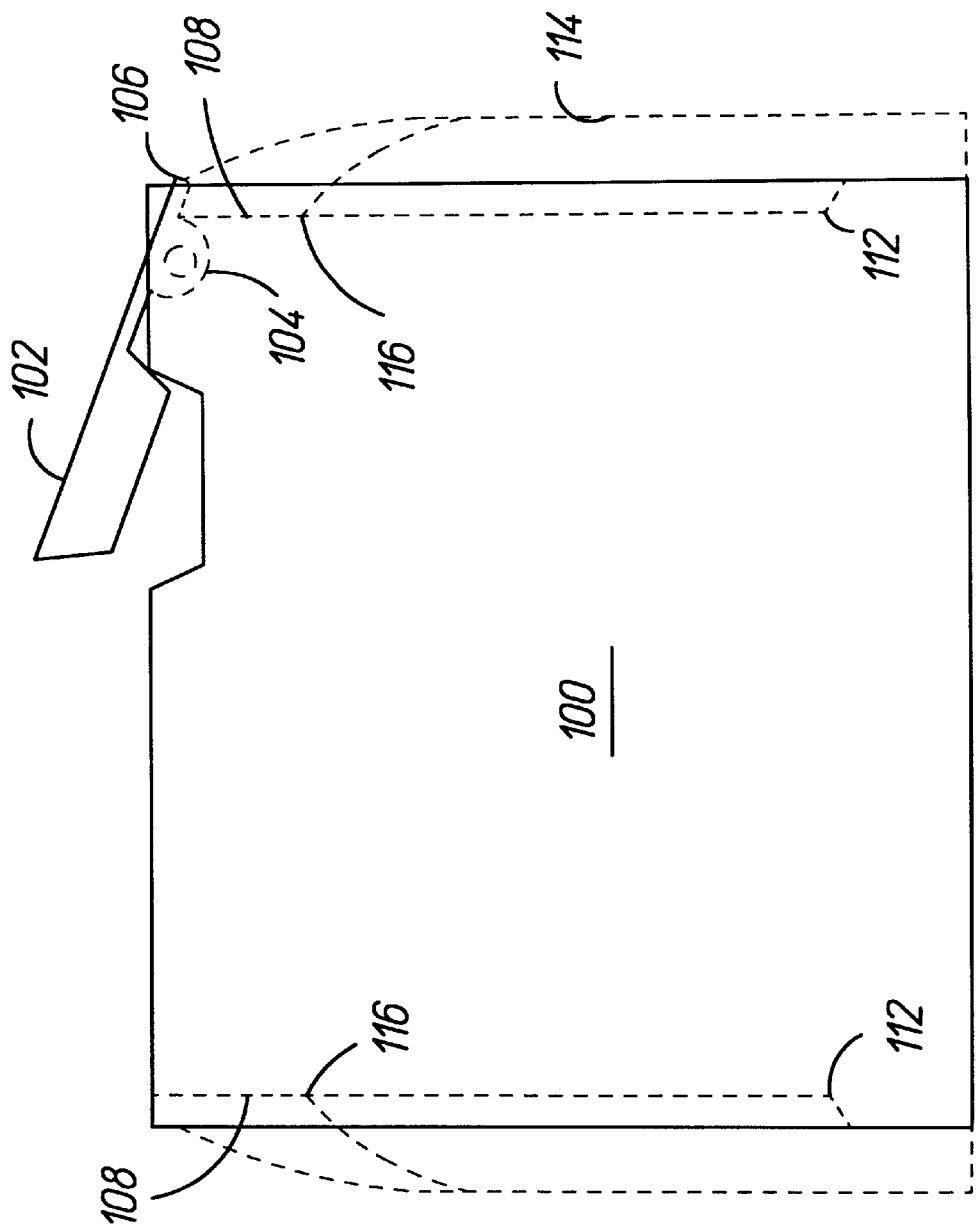
FIG. 1 is a plane top view of a mini-cartridge.
Figure 2:
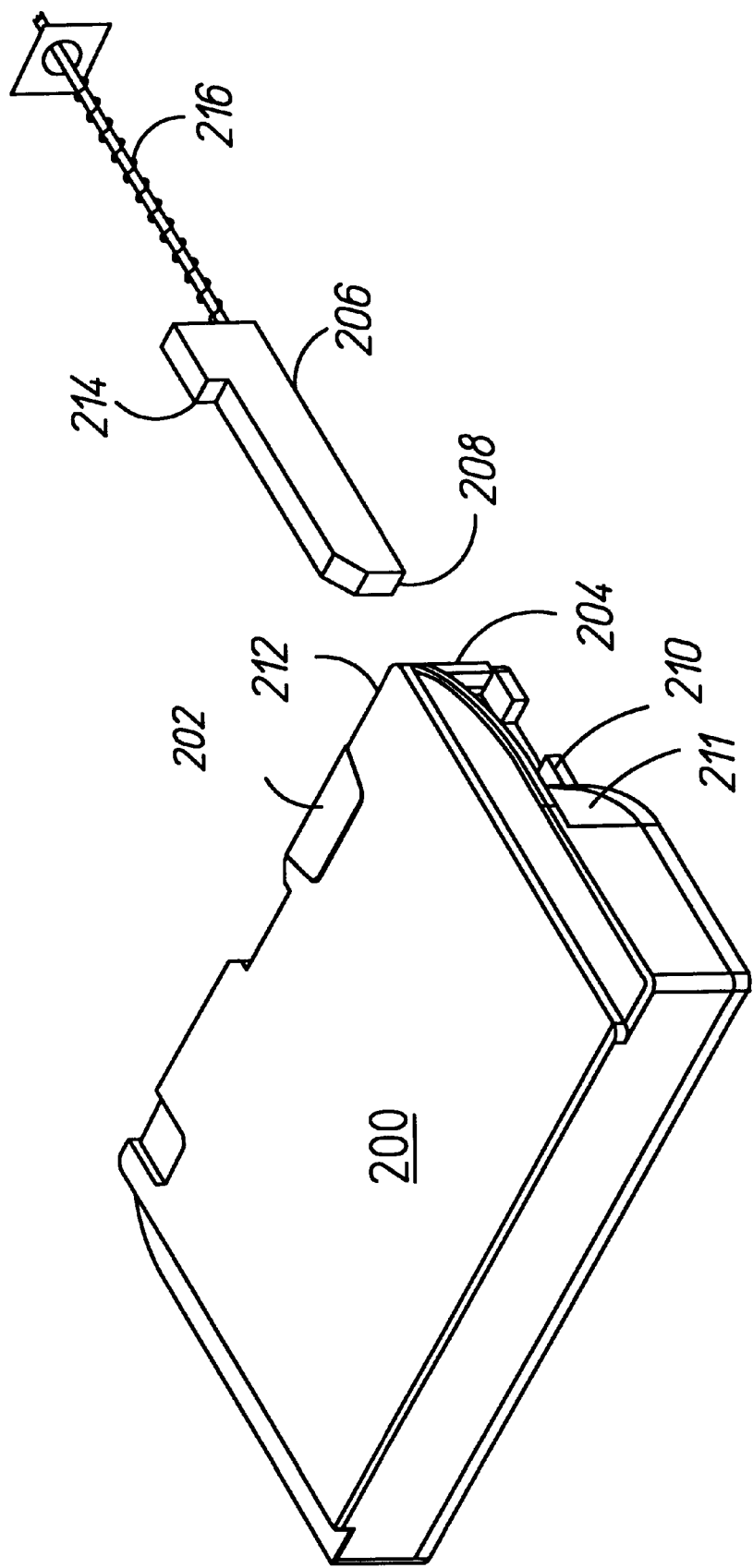
FIG. 2 is a perspective view of a mini-cartridge along with a simplified view of a plunger in accordance with the invention.

FIG. 2 illustrates a new mini-cartridge 200 having a closed door 202 with door extension 204. A plunger 206 has a tip 208 that makes contact with the door extension 204 to open the door. The plunger 206 is simplified in FIG. 2 to facilitate understanding. As the mini-cartridge is moved toward the plunger, the beginning 210 of the curved sidewall 211 moves toward the tip 208. Before the beginning 210 of the curved sidewall 211 reaches the tip 208, a corner 212 of the front face of the mini-cartridge contacts a step 214 on the plunger. As the mini-cartridge is inserted further in the drive, the corner 212 pressing against step 214 retracts the plunger 206 rearward into the drive, compressing spring 216, while still holding the door 202 open. As a result of the corner 212 pressing against the step 214, the curved sidewall 211 does not contact the tip 208 and no lateral force is placed on the plunger 206. Therefore, there is no excessive wear or binding of the plunger 206.

FIG. 3A is a top view of the plunger 206 showing additional detail of the plunger and chassis mounting features. The plunger has a additional parallel arm 300 that prevents lateral and vertical deflection of the plunger 206. Parallel arm 300 is supported by a front guide 302. The opposite end of the plunger is supported by a rear guide 304. As depicted in FIG. 3A, the plunger is depressed slightly rearward from a rest position to provide better visibility of the top of the front guide 302.

FIG. 3B is a cross section of the plunger illustrated in FIG. 3A, showing parallel arm 300 captured in the front guide 302. Note that the plunger cannot move laterally or vertically. The front guide 302 is on a fixed rail 308. The fixed rail 308 forms a slot 306 that provides guidance and alignment for a metal baseplate on the lower surface of the mini-cartridge.

Figure 3C:
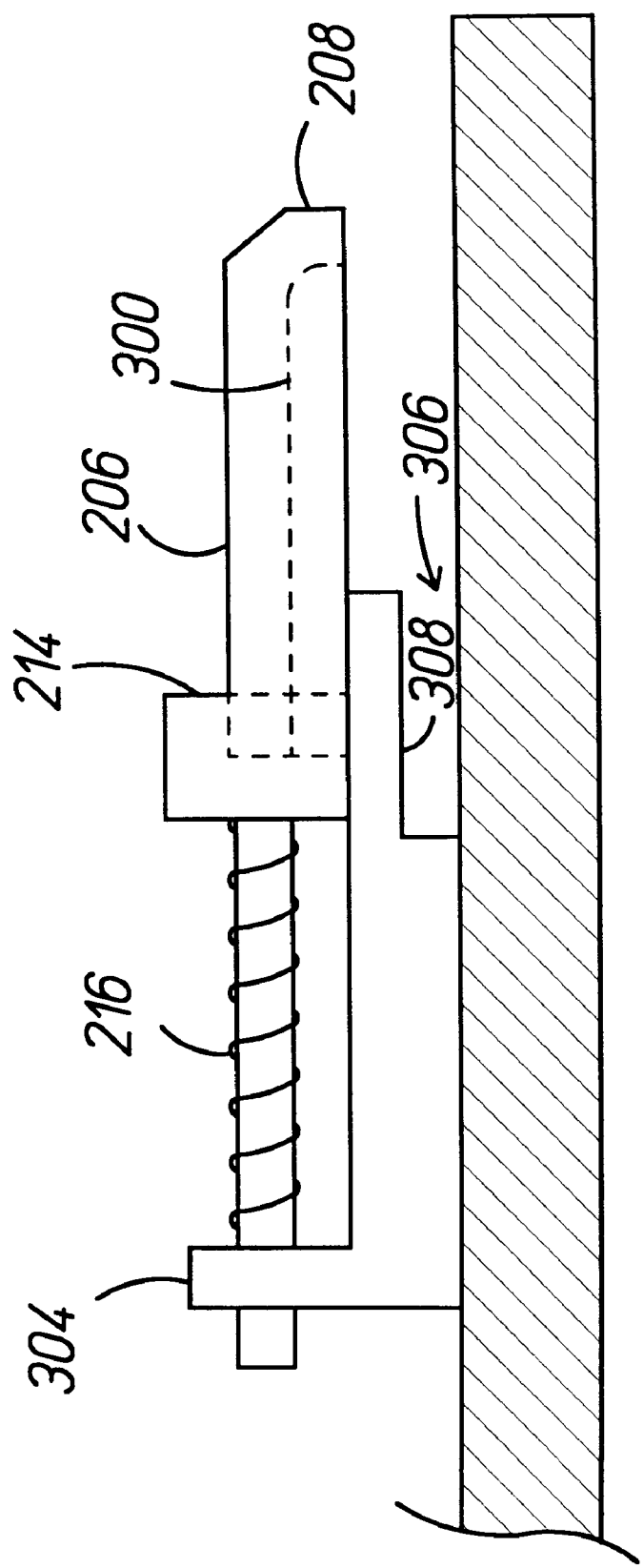
FIG. 3C is a side view and cross section of the door opener of FIG. 3A.

FIG. 3C is a side view of the plunger and the front and rear guides. As depicted in FIG. 3C, the plunger is in the normal rest position.

Figure 4A:
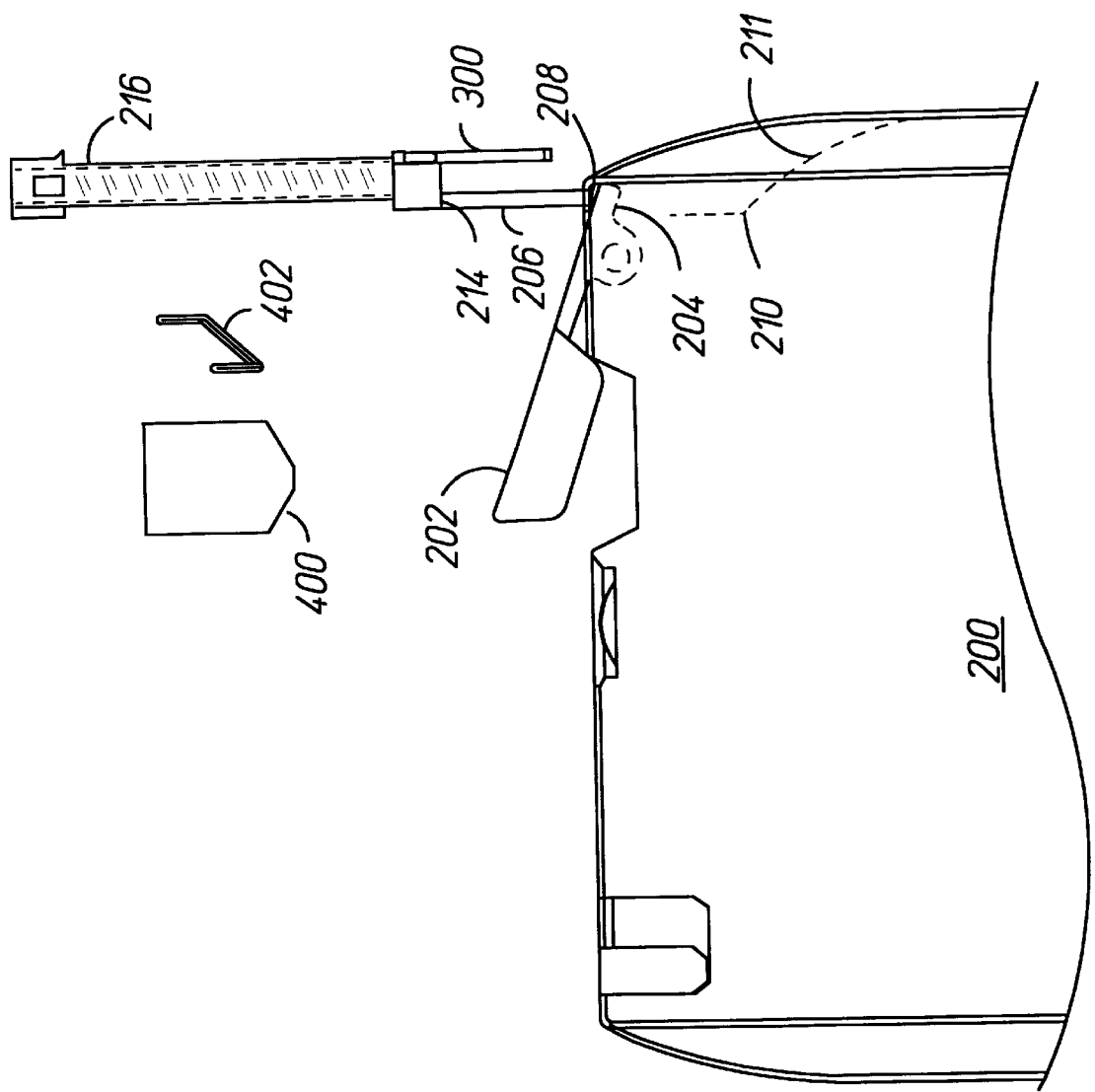
FIG. 4A is a plane top view of a mini-cartridge in initial contact with a door opener.

FIG. 4A is a top view of a new mini-cartridge being inserted in a drive chassis having a door opener as illustrated in FIGS. 3A-3C. As depicted in FIG. 4A, the plunger tip 208 is holding the door 202 partially open. A magnetic head 400 makes contact with a tape in the mini-cartridge when the mini-cartridge is fully inserted with the door open. A short wall 402 in the bottom of the drive chassis helps hold the mini-cartridge door 202 open when the cartridge is inserted further into the drive and also ensures that the door cannot contact and possibly damage other parts near the magnetic head 400.

Figure 4B:
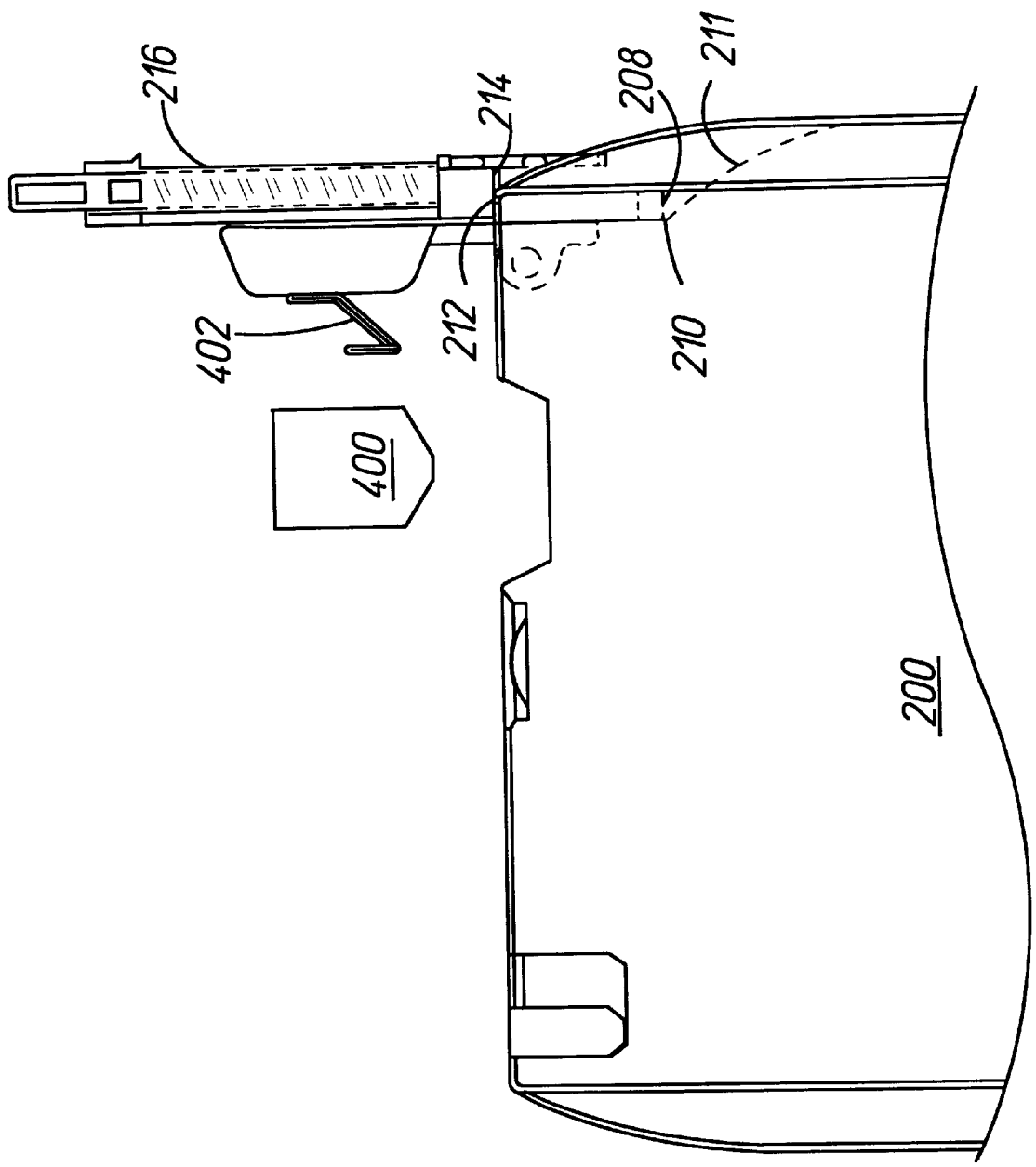
FIG. 4B is a plane top view of the mini-cartridge of FIG. 4A inserted sufficiently to have the door fully open.

FIG. 4B is a top view of the mini-cartridge and drive chassis of FIG. 4A with the mini-cartridge inserted to the point where corner 212 first touches step 214. Note that plunger tip 208 does not contact the mini-cartridge curved sidewall 211.

Figure 4C:
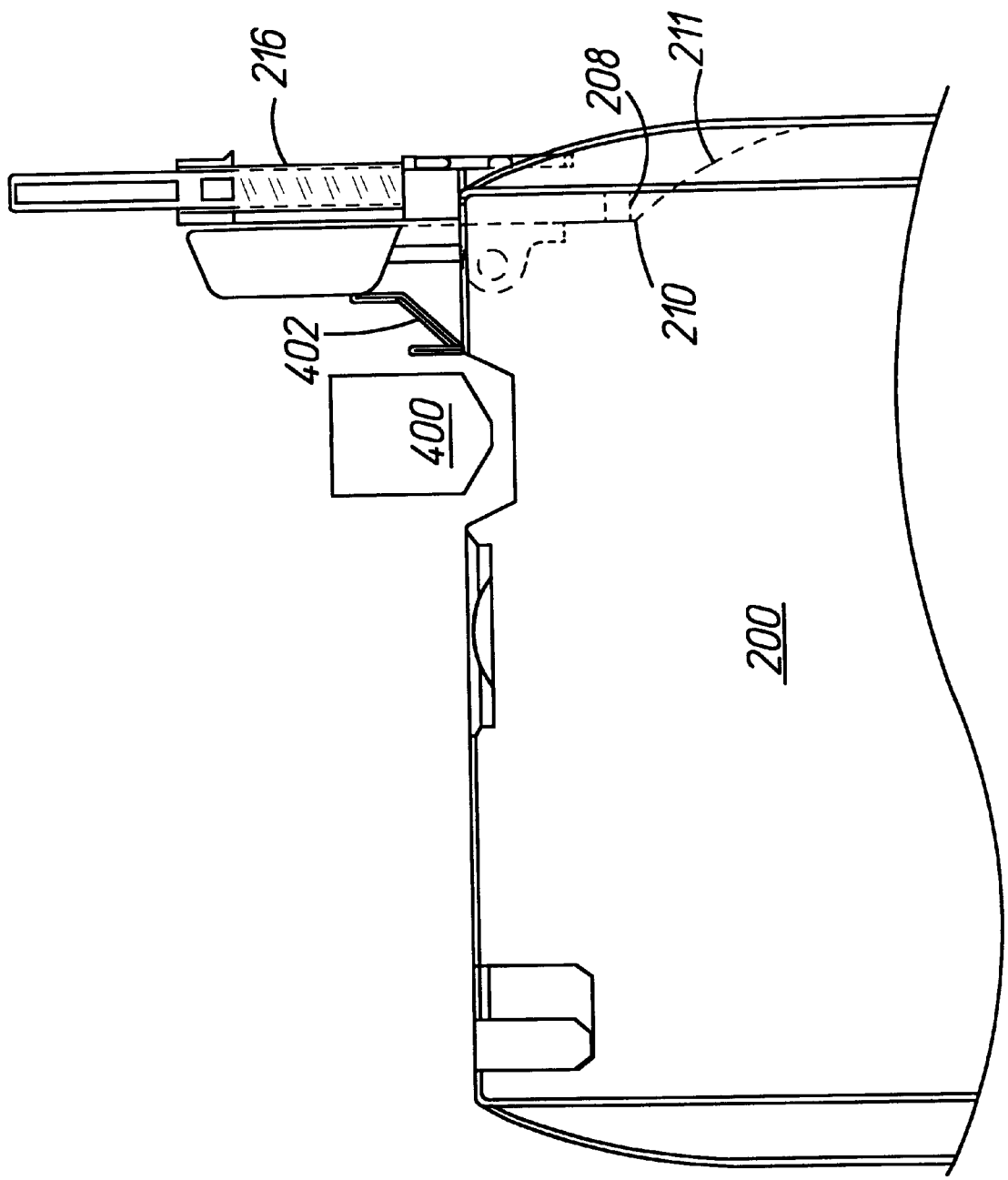
FIG. 4C is a plane top view of the mini-cartridge of FIG. 4A fully inserted into a drive with the plunger fully retracted.

FIG. 4C is a top view of the mini-cartridge and drive chassis of FIG. 4A with the mini-cartridge fully inserted. Note that the plunger 206 is retracted and the spring 216 is compressed. Note that the head 400 extends through the front face of the mini-cartridge. Note that chassis wall 402 provides additional guidance for the open door 202. Finally, note that the plunger tip 208 does not contact the mini-cartridge curved sidewall 211.

Figure 5:
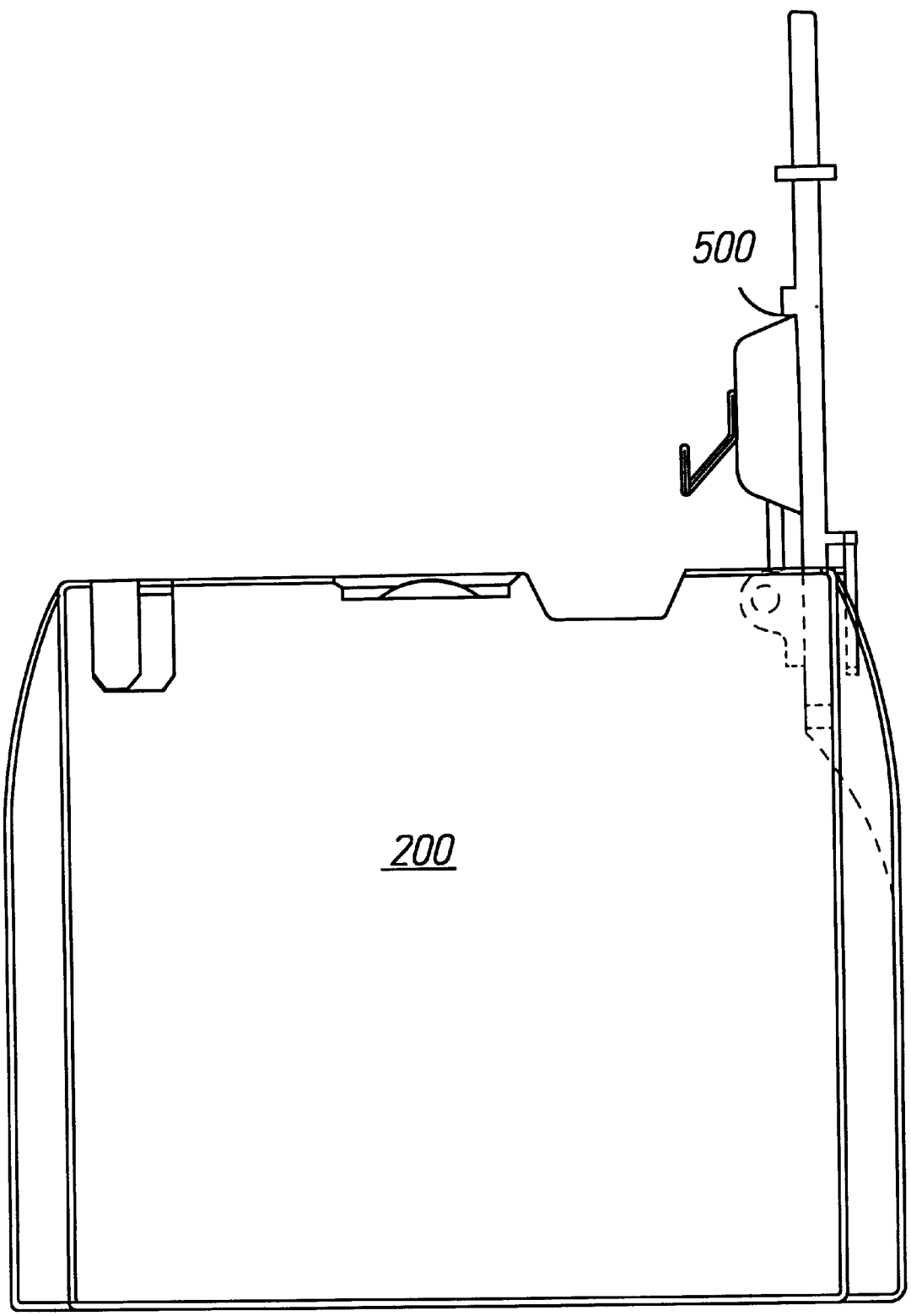
FIG. 5 is plane top view of a mini-cartridge in the position of FIG. 4B with an alternative embodiment of the door opener.

Using one corner (FIG. 2, 212) of the mini-cartridge to retract the plunger is only one example embodiment. Other cartridge surfaces may be used. For example, FIG. 5 illustrates an alternative embodiment in which the tip of the open door 202 contacts a step 500 on the plunger to retract the plunger. In addition, it is not necessary for the tip of the plunger to open the door. The general requirement is for two displaced surfaces, the first surface contacting the extension and opening the door and the second surface retracting the plunger.

Note that all the embodiments illustrated have a compression spring arrangement but an extension spring arrangement may be readily used as an alternative. The spring needs to provide enough force to open the mini-cartridge door but should be limited to permit ease of cartridge insertion. The embodiments illustrated are low cost (2 parts) and easily assembled. The assembly reduces binding because there are no lateral forces and the plunger is prevented from moving laterally or vertically. In addition, tight mechanical tolerances are not required.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for opening a door in a tape cartridge, the door having an extension, the apparatus comprising:

a plunger having first and second contacting surfaces, the plunger moveable linearly along a first direction;

the plunger positioned relative to the tape cartridge such that when the tape cartridge is moved in the first direction towards the plunger, the first contacting surface on the plunger contacts the extension on the door of the tape cartridge and opens the door; and the second contacting surface on the plunger positioned such that when the tape cartridge is moved further in the first direction after the extension contacts the first contacting surface, the tape cartridge contacts the second contacting surface, moving the plunger in the first direction.

2. The apparatus of claim 1 wherein the first contacting surface comprises a tip on the plunger.

3. The apparatus of claim 1 wherein the second contacting surface comprises a step on the plunger.

4. The apparatus of claim 1, the tape cartridge further comprising a front surface, wherein the second contacting surface on the plunger is positioned such that the front surface of the tape cartridge contacts the second contacting surface and moves the plunger in the first direction.

5. The apparatus of claim 1, wherein the second contacting surface on the plunger is positioned such that the door of the tape cartridge contacts the second contacting surface and moves the plunger in the first direction.

6. The apparatus of claim 1 further comprising:

an arm attached to the plunger, the arm parallel to the plunger and moving linearly with the plunger; and a bracket, the arm passing through the bracket, the bracket preventing movement vertically and movement laterally to the first direction of the arm and the plunger attached to the arm.

* * * * *